United States Patent
Mallick et al.

(10) Patent No.: US 11,012,512 B1
(45) Date of Patent: May 18, 2021

(54) HOST DEVICE WITH AUTOMATED WRITE THROTTLING RESPONSIVE TO STORAGE SYSTEM WRITE PRESSURE CONDITION

(71) Applicant: EMC IP Holding Company LLC, Hopkinton, MA (US)

(72) Inventors: Sanjib Mallick, Bangalore (IN); Krishna Deepak Nuthakki, Bangalore (IN); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/878,678

(22) Filed: May 20, 2020

(51) Int. Cl.
*H04L 29/08* (2006.01)

(52) U.S. Cl.
CPC .............................. *H04L 67/1097* (2013.01)

(58) Field of Classification Search
CPC ........... G06F 2209/5022; G06F 9/4806; G06F 9/4843; G06F 9/5083
See application file for complete search history.

(56) References Cited

U.S. PATENT DOCUMENTS

| | | |
|---|---|---|
| 6,567,397 B1 | 5/2003 | Campana et al. |
| 6,687,746 B1 | 2/2004 | Shuster et al. |
| 6,697,875 B1 | 2/2004 | Wilson |
| 7,275,103 B1 | 9/2007 | Thrasher et al. |
| 7,454,437 B1 | 11/2008 | Lavallee et al. |
| 7,617,292 B2 | 11/2009 | Moore et al. |
| 7,668,981 B1 | 2/2010 | Nagineni et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |

(Continued)

FOREIGN PATENT DOCUMENTS

| | | |
|---|---|---|
| CN | 103677927 B | 2/2017 |
| EP | 1117028 A2 | 7/2001 |
| EP | 2667569 A1 | 11/2013 |

OTHER PUBLICATIONS

PCT/US2019/052549, WO, Dec. 4, 2019, International Search Report and Written Opinion.

(Continued)

*Primary Examiner* — Shean Tokuta
(74) *Attorney, Agent, or Firm* — Ryan, Mason & Lewis, LLP

(57) ABSTRACT

A host device comprises a processor coupled to a memory. The host device is configured, for each of a plurality of initiators of the host device from which write operations are sent to a storage system for processing, to repeatedly send to the storage system a command to obtain from the storage system write pressure information maintained by the storage system for that initiator, and responsive to the write pressure information obtained from the storage system for a corresponding one of the initiators indicating that the corresponding initiator is associated with a write pressure condition, to at least temporarily reduce a rate at which the write operations are sent from the corresponding initiator to the storage system. The operations of repeatedly sending the command, and at least temporarily reducing the rate, are illustratively performed by at least one multi-path input-output driver of a multi-path layer of the host device.

20 Claims, 4 Drawing Sheets

(56) References Cited

U.S. PATENT DOCUMENTS

| | | | |
|---|---|---|---|
| 7,904,681 B1 | 3/2011 | Bappe et al. | |
| 7,925,872 B2 | 4/2011 | Lai et al. | |
| 8,250,256 B2 | 8/2012 | Ghosalkar et al. | |
| 8,285,825 B1 | 10/2012 | Nagaraj et al. | |
| 8,417,817 B1* | 4/2013 | Jacobs | H04L 69/28 |
| | | | 709/226 |
| 8,732,342 B1* | 5/2014 | Clark | G06F 3/0613 |
| | | | 710/6 |
| 8,825,919 B1 | 9/2014 | Lim et al. | |
| 8,832,334 B2 | 9/2014 | Okita | |
| 8,874,746 B1 | 10/2014 | Gonzalez | |
| 9,026,694 B1 | 5/2015 | Davidson et al. | |
| 9,122,503 B1* | 9/2015 | Hoff | G06F 21/566 |
| 9,201,803 B1 | 12/2015 | Derbeko et al. | |
| 9,400,611 B1 | 7/2016 | Raizen | |
| 9,417,907 B1* | 8/2016 | Dire | G06F 9/4806 |
| 9,430,368 B1 | 8/2016 | Derbeko et al. | |
| 9,594,780 B1 | 3/2017 | Esposito et al. | |
| 9,647,933 B1 | 5/2017 | Tawri et al. | |
| 9,672,160 B1 | 6/2017 | Derbeko et al. | |
| 9,778,852 B1 | 10/2017 | Marshak et al. | |
| 10,228,868 B1* | 3/2019 | Liang | G06F 12/0246 |
| 10,270,794 B1* | 4/2019 | Mukerji | H04L 63/1425 |
| 10,289,325 B1 | 5/2019 | Bono | |
| 10,346,076 B1* | 7/2019 | Jonnala | G06F 3/0634 |
| 10,353,714 B1 | 7/2019 | Gokam et al. | |
| 10,439,878 B1 | 10/2019 | Tah et al. | |
| 10,474,367 B1 | 11/2019 | Mallick et al. | |
| 10,474,383 B1* | 11/2019 | Wang | G06F 3/0653 |
| 10,476,960 B1 | 11/2019 | Rao et al. | |
| 10,496,282 B1* | 12/2019 | Martin | G06F 3/061 |
| 10,521,369 B1 | 12/2019 | Mallick et al. | |
| 10,606,496 B1 | 3/2020 | Mallick et al. | |
| 10,637,917 B2 | 4/2020 | Mallick et al. | |
| 10,652,206 B1 | 5/2020 | Pusalkar et al. | |
| 10,659,371 B1* | 5/2020 | Jain | H04L 41/5019 |
| 10,728,166 B2* | 7/2020 | Balakrishnan | H04L 47/822 |
| 2002/0023151 A1 | 2/2002 | Iwatani | |
| 2002/0103923 A1 | 8/2002 | Cherian et al. | |
| 2004/0010563 A1 | 1/2004 | Forte et al. | |
| 2006/0026346 A1 | 2/2006 | Kadoiri et al. | |
| 2006/0277383 A1 | 12/2006 | Hayden et al. | |
| 2007/0174849 A1 | 7/2007 | Cheung et al. | |
| 2008/0043973 A1 | 2/2008 | Lai et al. | |
| 2008/0201458 A1 | 8/2008 | Salli | |
| 2008/0301332 A1 | 12/2008 | Butler et al. | |
| 2009/0248917 A1* | 10/2009 | Kalos | G06F 3/0656 |
| | | | 710/39 |
| 2009/0259749 A1 | 10/2009 | Barrett et al. | |
| 2010/0313063 A1 | 12/2010 | Venkataraja et al. | |
| 2011/0197027 A1 | 8/2011 | Balasubramanian et al. | |
| 2011/0296230 A1 | 12/2011 | Chen et al. | |
| 2012/0102369 A1 | 4/2012 | Hiltunen et al. | |
| 2012/0246345 A1 | 9/2012 | Contreras et al. | |
| 2013/0117766 A1 | 5/2013 | Bax et al. | |
| 2013/0339551 A1 | 12/2013 | Flanagan et al. | |
| 2014/0105068 A1 | 4/2014 | Xu | |
| 2015/0067271 A1* | 3/2015 | Camp | G06F 12/0804 |
| | | | 711/143 |
| 2015/0222705 A1 | 8/2015 | Stephens | |
| 2015/0242134 A1 | 8/2015 | Takada et al. | |
| 2016/0092136 A1 | 3/2016 | Balakrishnan et al. | |
| 2016/0117113 A1 | 4/2016 | Li et al. | |
| 2016/0313944 A1* | 10/2016 | Hodgdon | G06F 3/0647 |
| 2016/0335003 A1 | 11/2016 | Ahmed et al. | |
| 2017/0235507 A1 | 8/2017 | Sinha et al. | |
| 2017/0317991 A1* | 11/2017 | Lionetti | G06F 21/6218 |
| 2018/0121366 A1* | 5/2018 | Tian | G06F 3/067 |
| 2018/0173464 A1* | 6/2018 | Wongso | G06F 3/0614 |
| 2018/0189635 A1 | 7/2018 | Olarig et al. | |
| 2018/0210664 A1* | 7/2018 | Weissbrem | G06F 3/0619 |
| 2018/0253256 A1 | 9/2018 | Bharadwaj | |
| 2018/0284997 A1* | 10/2018 | Dalmatov | G11C 16/349 |
| 2018/0288155 A1* | 10/2018 | Zhou | G06F 3/0611 |
| 2018/0317101 A1 | 11/2018 | Koue | |
| 2019/0095299 A1 | 3/2019 | Liu et al. | |
| 2019/0104015 A1* | 4/2019 | Moore | H04L 43/16 |
| 2019/0108888 A1 | 4/2019 | Sarkar et al. | |
| 2019/0205203 A1* | 7/2019 | Hwang | G06F 11/0727 |
| 2019/0207873 A1* | 7/2019 | Kasheff | H04L 67/306 |
| 2019/0303308 A1* | 10/2019 | Knauft | H04L 47/30 |
| 2019/0334987 A1 | 10/2019 | Mallick et al. | |
| 2020/0036604 A1* | 1/2020 | Kalman | G06F 3/0659 |
| 2020/0045131 A1* | 2/2020 | Nigam | H04L 43/028 |
| 2020/0097203 A1 | 3/2020 | Mallick et al. | |
| 2020/0106698 A1 | 4/2020 | Rao et al. | |
| 2020/0110552 A1 | 4/2020 | Kumar et al. | |
| 2020/0112608 A1 | 4/2020 | Patel et al. | |

OTHER PUBLICATIONS

PCT/US2019/053204, WO, Dec. 16, 2019, International Search Report and Written Opinion.
PCT/US2019/053473, WO, Dec. 19, 2019, International Search Report and Written Opinion.
PCT/US2019/067144, WO, May 4, 2020, International Search Report and Written Opinion.
Kris Piepho, "Dell EMC SC Series Storage: Microsoft Multipath I/O," Dell EMC Best Practices, Jan. 2017, 57 pages.
NVM Express, "NVM Express, Revision 1.3," NVM Express, May 1, 2017, 282 pages.
VMware, "Multipathing Configuration for Software iSCSI Using Port Binding," Technical White Paper, Apr. 25, 2012, 15 pages.
Dell EMC, "Dell EMC SC Series Storage: Microsoft Multipath I/O," Dell EMC Engineering, Jun. 2017, 56 pages.
Dell EMC, "Dell EMC PowerPath Family: PowerPath and PowerPath/VE Multipathing," Data Sheet, 2017, 3 pages.
EMC, "EMC PowerPath and PowerPath/VE Family for Windows," Installation and Administration Guide, Oct. 2018, 102 pages.
EMC, "EMC Powerpath Load Balancing and Failover", Comparison with native MPIO operating system solutions, Feb. 2011, 28 pages.
Dell EMC, "PowerMax OS," Dell EMC PowerMax Family Product Guide, May 2019, 192 pages.
Dell EMC, "Dell EMC SC Series Storage and Microsoft Multipath I/O," CML 1004, Jul. 2018, 36 pages.
VMware, Inc. "VMware VMFS Volume Management," 2009, 8 pages.
Dell EMC, "Dell EMC Unity: Virtualization Integration," Technical White Paper, Oct. 2019, 39 pages.
Dell EMC, "Dell EMC PowerMax: iSCSI Implementation for Dell EMC Storage Arrays Running PowerMaxOS," Technical White Paper, Sep. 2019, 35 pages.
U.S. Appl. No. 16/697,393 filed in the name of Vinay G. Rao et al. filed Nov. 27, 2019, and entitled "Automated Seamless Migration of Logical Storage Devices."
U.S. Appl. No. 16/710,828 filed in the name of Amit Pundalik Anchi et al. filed Dec. 11, 2019, and entitled "Automated Seamless Migration with Signature Issue Resolution."

* cited by examiner

FIG. 4

PER-INITIATOR COUNTERS MAINTAINED BY STORAGE ARRAY FOR A GIVEN HOST DEVICE 102-*i*

400-*i*

| INITIATOR 1 ID | CURRENT COUNT OF WRITE OPERATIONS FROM INITIATOR 1 |
| --- | --- |
| INITIATOR 2 ID | CURRENT COUNT OF WRITE OPERATIONS FROM INITIATOR 2 |
| ... | ... |
| INITIATOR K ID | CURRENT COUNT OF WRITE OPERATIONS FROM INITIATOR K |

HOST DEVICE WITH AUTOMATED WRITE THROTTLING RESPONSIVE TO STORAGE SYSTEM WRITE PRESSURE CONDITION

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (TO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. In many situations, the IO operations include bursts of write operations that are generated by one or more host devices and sent to the storage system, potentially overwhelming the limited IO queues and other resources that the storage system can allocate for the use of the individual host devices. For example, such bursts of write operations can occur when host devices run applications in-memory, and subsequently destage cached changes in batches. Write bursts in these and other situations can cause the storage system to frequently signal queue-full conditions back to the host devices, which can adversely impact the performance of the host devices.

SUMMARY

Illustrative embodiments provide techniques for automated write throttling in a host device based at least in part on a write pressure condition detected by a storage array or other type of storage system, which advantageously avoid the drawbacks of the conventional techniques described above.

In some embodiments, at least a portion of the automated write throttling functionality is implemented in at least one host driver, such as a multi-path input-output (MPIO) driver of the host device. Other types of host drivers can be used in place of or in addition to one or more MPIO drivers. For example, in some embodiments, at least a portion of the disclosed automated write throttling functionality is carried out using one or more iSCSI drivers, or other types of non-MPIO host drivers.

As indicated above, illustrative embodiments provide significant advantages over conventional practice. For example, these embodiments advantageously avoid the substantial negative host performance implications of excessive signaling of queue-full conditions in a storage array. Moreover, illustrative embodiments allow host devices to periodically "test the waters" in order to determine in a particularly efficient manner whether or not storage array write pressure conditions have abated.

In one embodiment, an apparatus comprises a host device that includes a processor and a memory, with the processor being coupled to the memory. The host device is configured, for each of a plurality of initiators of the host device from which write operations are sent to a storage system for processing, to repeatedly send to the storage system a command to obtain from the storage system write pressure information maintained by the storage system for that initiator, and responsive to the write pressure information obtained from the storage system for a corresponding one of the initiators indicating that the corresponding initiator is associated with a write pressure condition, to at least temporarily reduce a rate at which the write operations are sent from the corresponding initiator to the storage system.

In some embodiments, the host device further comprises a multi-path layer comprising at least one MPIO driver configured to control delivery of IO operations from the host device to particular ports of the storage system over selected ones of a plurality of paths through a network. The host device may be one of a plurality of host devices that includes one or more additional host devices each configured to communicate over the network with the storage system and wherein each additional host device comprises at least one MPIO driver configured to control delivery of IO operations from that host device to particular ports of the storage system over selected ones of a plurality of paths through the network.

The paths are illustratively associated with respective initiator-target pairs with each of a plurality of initiators of the initiator-target pairs comprising a corresponding host bus adaptor of the host device and each of a plurality of targets of the initiator-target pairs comprising a corresponding one of the ports of the storage system.

The above-noted operations of repeatedly sending the command, and at least temporarily reducing the rate, are illustratively performed in some embodiments by at least one MPIO driver of a multi-path layer of the host device.

In some embodiments, the command comprises at least one predetermined vendor unique command of a storage access protocol which the host device utilizes to communicate with the storage system.

The write pressure information obtained by the host device for respective ones of the initiators in some embodiments is determined in the storage system utilizing a plurality of per-initiator write operation counters of the storage system. For example, a given one of the per-initiator write operation counters illustratively maintains a count of write operations received in the storage system from a corresponding one of the initiators.

Additionally or alternatively, the write pressure information obtained by the host device from the storage system for a corresponding one of the initiators is illustratively determined in the storage system based at least in part on identification by the storage system of one or more of the initiators that are each making a relatively high contribution to a write pressure condition detected in the storage system as compared to other ones of the initiators that are each making a relatively low contribution to the write pressure condition detected in the storage system.

In some embodiments, the write pressure information obtained by the host device from the storage system for a corresponding one of the initiators illustratively comprises one of (i) an indication that the corresponding initiator is not currently making a relatively high contribution to a write pressure condition detected in the storage system as compared to other ones of the initiators, and (ii) an indication that the corresponding initiator is currently making a relatively high contribution to a write pressure condition detected in the storage system as compared to other ones of the initiators.

The write pressure condition detected in the storage system in some embodiments comprises the storage system reaching a specified percentage of a designated write pending limit for the storage system, and/or each of one or more storage devices of the storage system reaching a specified percentage of a designated write pending limit for that storage device. Other types of write pressure conditions can be detected in other embodiments.

The indication that the corresponding initiator is currently making a relatively high contribution to a write pressure condition detected in the storage system as compared to other ones of the initiators in some embodiments comprises a check condition indicator received by the host device from the storage system responsive to sending the command.

At least temporarily reducing a rate at which the write operations are sent from the corresponding initiator to the storage system in some embodiments comprises reducing the rate by a specified amount for a throttle-down period, repeating the sending of the command in conjunction with an end of the throttle-down period, and determining based at least in part on write pressure information obtained utilizing the repeated sending of the command whether or not to continue to reduce the rate for another throttle-down period. A duration of a given one of the throttle-down periods is illustratively determined by randomly selecting the duration of the throttle-down period from a specified range of possible durations.

These and other illustrative embodiments include, without limitation, apparatus, systems, methods and computer program products comprising processor-readable storage media.

BRIEF DESCRIPTION OF THE DRAWINGS

FIG. 4 shows an example of a set of per-initiator counters maintained by a storage system for use in detecting write pressure conditions in an illustrative embodiment.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
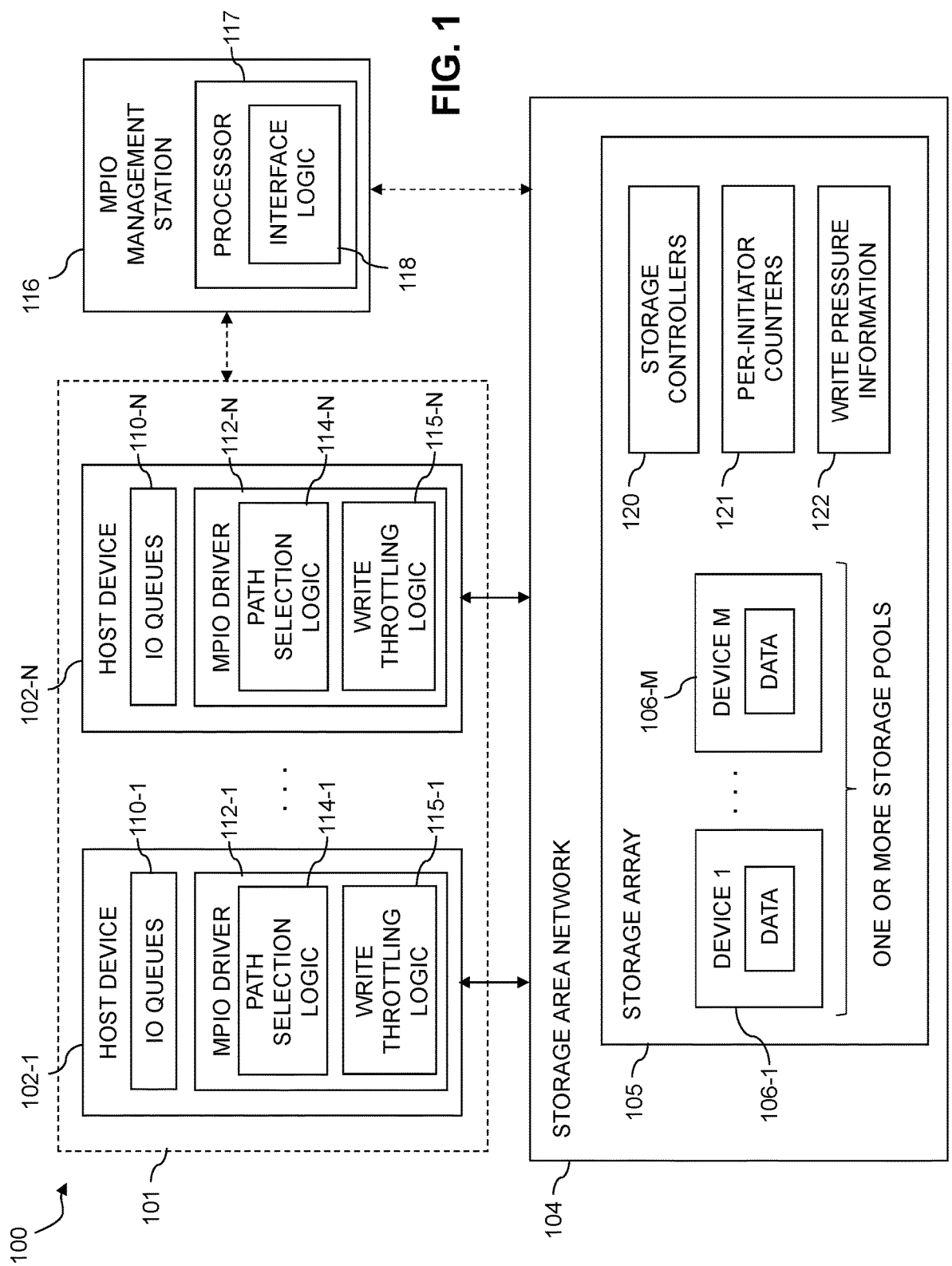
FIG. 1 is a block diagram of an information processing system configured with functionality for automated write throttling in a multi-path layer of a host device in an illustrative embodiment.

FIG. 1 shows an information processing system 100 configured in accordance with an illustrative embodiment. The information processing system 100 comprises a plurality of host devices 102-1, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand (IB), Gigabit Ethernet or Fibre Channel (FC). Numerous alternative networking arrangements are possible in a given embodiment, as will be appreciated by those skilled in the art.

The host devices 102 comprise respective sets of IO queues 110-1, . . . 110-N and respective MPIO drivers 112-1, . . . 112-N. The MPIO drivers 112 collectively comprise a multi-path layer of the host devices 102. Path selection functionality for delivery of IO operations from the host devices 102 to the storage array 105 is provided in the multi-path layer by respective instances of path selection logic 114-1, . . . 114-N implemented within the MPIO drivers 112. The multi-path layer further provides functionality for automated write throttling. Such functionality is provided at least in part using respective instances of write throttling logic 115-1, . . . 115-N implemented within the MPIO drivers 112.

The MPIO drivers 112 may comprise, for example, otherwise conventional MPIO drivers, such as PowerPath® drivers from Dell EMC, suitably modified in the manner disclosed herein to provide functionality for automated write throttling. Other types of MPIO drivers from other driver vendors may be suitably modified to incorporate functionality for automated write throttling as disclosed herein.

The host devices 102 can include additional or alternative components. For example, in some embodiments, the host devices 102 comprise respective local caches, implemented using respective memories of those host devices. A given such local cache can be implemented using one or more cache cards, possibly implementing caching techniques such as those disclosed in U.S. Pat. Nos. 9,201,803, 9,430,368 and 9,672,160, each entitled "System and Method for Caching Data," and incorporated by reference herein. A wide variety of different caching techniques can be used in other embodiments, as will be appreciated by those skilled in the art. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

The system 100 further comprises an MPIO management station 116 that includes a processor 117 implementing interface logic 118. The interface logic 118 is utilized to communicate with the host devices 102 and the storage array 105. Such an MPIO management station 116 provides management functionality for the multi-path layer comprising the MPIO drivers 112 of the host devices 102. In some embodiments, host device management software executing on the MPIO management station 116 interacts with storage array management software executing on the storage array 105.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

A given IO operation is therefore illustratively generated by a process of an application running on the host device 102-1, and is queued in a given one of the IO queues 110-1 of the host device 102-1 with other operations generated by other processes of that application, and possibly other processes of other applications.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

In the FIG. 1 embodiment, the storage array 105 comprises a plurality of storage controllers 120, one or more sets of per-initiator counters 121, and one or more instances of write pressure information 122. The write pressure information 122 is illustratively determined by the storage array 105 utilizing the per-initiator counters 121. It is assumed that the MPIO drivers 112 of the respective host devices 102 can read or otherwise obtain at least portions of the write pressure information 122 directly or indirectly from the storage array 105.

At least portions of the write pressure information 122 can be obtained by the host device 102-1 from the storage array 105 utilizing an in-band communication mechanism in which one or more predetermined commands in a designated storage protocol are sent from the host device 102-1 to the storage array 105. Such predetermined commands can comprise, for example, a log sense command, a mode sense command, a "vendor unique command" or VU command, or combinations of multiple instances of these or other commands, in an otherwise standardized command format, such as a SCSI format or other type of format.

Additionally or alternatively, at least portions of the write pressure information 122 can be obtained by the host device 102-1 from the storage array 105 utilizing an out-of-band communication mechanism. For example, an out-of-band communication mechanism of this type can involve host management software of the host device 102-1 communicating with storage array management software of the storage array 105 over an IP network connection or other type of network connection. Such host management software can include software running on the MPIO management station 116, in addition to or in place of software running on the individual host devices 102.

Additional components not explicitly shown in the figure, such as one or more storage caches, may also be provided in the storage array 105 for use in processing IO operations. For example, in some embodiments, each of the storage controllers 120 has a different local cache or a different allocated portion of a global cache associated therewith, although numerous alternative arrangements are possible. The storage controllers 120 can be implemented as respective storage processors, directors or other storage system components configured to control storage system operations relating to processing of IO operations.

The MPIO driver 112-1 is further configured, for each of a plurality of initiators of the host device 102-1 from which write operations are sent to a storage array 105 for processing, to repeatedly send to the storage array 105 a command to obtain from the storage array 105 write pressure information maintained by the storage array 105 for that initiator. Responsive to the write pressure information obtained from the storage array 105 for a corresponding one of the initiators indicating that the corresponding initiator is associated with a write pressure condition, the MPIO driver 112-1 is further configured to at least temporarily reduce a rate at which the write operations are sent from the corresponding initiator to the storage array 105.

As indicated above, the initiators of the host device 102-1 illustratively comprise respective HBAs of the host device 102-1, although other types of initiators can be used in other embodiments, as well as combinations of different initiators of different types. The term "initiator" as used herein is therefore intended to be broadly construed.

The above-noted command in some embodiments comprises at least one predetermined vendor unique or VU command of a storage access protocol which the host device 102-1 utilizes to communicate with the storage array 105, such as a SCSI or NVMe protocol. A wide variety of different arrangements of commands may be used, as well as numerous associated timing techniques for repeatedly sending such commands from the host device 102-1 to the storage array 105. A "command" as the term is broadly used herein can comprise a combination of multiple distinct commands, such as respective different commands for different ones of a plurality of initiators. Separate commands are utilized in some embodiments for respective initiators. In other embodiments, a single command can be sent to obtain write pressure information for multiple initiators. These and other references herein to repeatedly sending a command from a host device to a storage array, to obtain write pressure information for one or more initiators of the host device, are intended to be broadly construed.

The operations of repeatedly sending the command, and at least temporarily reducing the rate, are illustratively performed by the MPIO driver 112-1 of the host device 102-1, utilizing its write throttling logic 115-1 in cooperation with its path selection logic 114-1, although other arrangements are possible.

An example of a process including such operations will be described below in conjunction with the flow diagram of FIG. 2. These and other operations referred to herein as being performed by an MPIO driver can in other embodiments be performed at least in part by other host device components.

In some embodiments, the write pressure information obtained by the MPIO driver 112-1 of the host device 102-1 for respective ones of the initiators is determined in the storage array 105 utilizing a corresponding set of the per-initiator counters 121 of the storage array 105. Such per-initiator counters 121 are examples of what are also referred to herein as "per-initiator write operation counters." A given such per-initiator counter illustratively maintains a count of write operations received in the storage array 105 from the corresponding one of the HBAs or other initiators of the host device 102-1. Other types of per-initiator counters can be used in other embodiments. An example of a set of per-initiator counters 121 maintained by the storage array 105 for initiators of a particular one of the host devices 102 is illustrated in FIG. 4. It is assumed that the storage array 105 maintains a similar set of such per-initiator counters for each of the host devices 102.

The write pressure information obtained by the host device 102-1 from the storage array 105 for a corresponding one of the initiators in some embodiments is determined in the storage array 105 based at least in part on identification by the storage array 105 of one or more of the initiators that are each making a relatively high contribution to a write pressure condition detected in the storage array 105 as compared to other ones of the initiators that are each making a relatively low contribution to the write pressure condition detected in the storage array 105.

Additionally or alternatively, the write pressure information obtained by the host device 102-1 from the storage array 105 for a corresponding one of the initiators illustratively comprises one of (i) an indication that the corresponding initiator is not currently making a relatively high contribution to a write pressure condition detected in the storage array 105 as compared to other ones of the initiators, and (ii) an indication that the corresponding initiator is currently making a relatively high contribution to a write pressure condition detected in the storage array 105 as compared to other ones of the initiators.

For example, the write pressure condition detected in the storage array 105 can comprise the storage array 105 reaching a specified percentage (e.g., 80%) of a designated write pending limit for the storage array 105, and/or each of one or more storage devices of the storage array 105 reaching a specified percentage (e.g., 80%) of a designated write pending limit for that storage device. Other types of write pressure conditions can be detected in the storage array 105 using other techniques, and the term "write pressure condition" as used herein is therefore intended to be broadly construed.

In some embodiments, the indication that the corresponding initiator is currently making a relatively high contribution to a write pressure condition detected in the storage array 105 as compared to other ones of the initiators illustratively comprises a check condition ("chk_cond") indicator received by the host device 102-1 from the storage array 105 responsive to sending the command. However, this only an example, and a wide variety of other types of indicators can be provided by the storage array 105 in response to one or more of the commands sent by the MPIO driver 112-1 in other embodiments.

The MPIO driver 112-1 in at least temporarily reducing a rate at which the write operations are sent from a corresponding initiator to the storage array 105 is illustratively configured to reduce the rate by a specified amount for a throttle-down period. A duration of the throttle-down period in some embodiments is determined by randomly selecting the duration of the throttle-down period from a specified range of possible durations.

The MPIO driver 112-1 illustratively repeats the sending of the command in conjunction with an end of the throttle-down period, and determines based at least in part on write pressure information obtained utilizing the repeated sending of the command whether or not to continue to reduce the rate for another throttle-down period. Such continued throttle-down periods can continue for a given initiator as long as the latest write pressure information obtained for that initiator from the storage array 105 continues to indicate that the given initiator is associated with a write pressure condition detected in the storage array 105.

As noted above, in some embodiments, write pressure information is obtained directly by the host device 102-1 from storage array 105. Such an arrangement illustratively utilizes an in-band communication mechanism in which one or more commands in a designated storage protocol are sent from the host device 102-1 to the storage array 105.

It is possible in other embodiments that write pressure information can be obtained by the host device 102-1 indirectly from the storage array 105 utilizing an out-of-band communication mechanism via at least one intermediary device. An intermediary device in such an embodiment illustratively comprises the MPIO management station 116 of system 100. The MPIO management station 116 can comprise a server configured to obtain the write pressure information directly from the storage array 105. The MPIO management station 116 is illustratively connected directly to the storage array 105 using protocols such as SCSI, Internet SCSI (iSCSI), FC, NVMeoFC and/or others.

The MPIO driver 112-1 on the host device 102-1 illustratively has connectivity to the MPIO management station 116. The MPIO management station 116 in some embodiments implements PowerPath® Management Appliance (PPMA) functionality to obtain access to the storage array 105. The MPIO driver 112-1 can obtain from the MPIO management station 116 certain types of storage array related information for use in various operations performed at least in part by the MPIO driver 112-1, in addition to or in place of obtaining such information directly from the storage array 105. Host multi-pathing software can be used to implement a multi-path layer comprising MPIO drivers 112 of respective host devices 102 as well as related management appliance software such as the above-noted PPMA of MPIO management station 116. Such host multi-pathing software can be configured to obtain write pressure information or other types of information to facilitate automated write throttling for one or more host devices as disclosed herein.

As indicated previously, conventional approaches to write throttling are problematic, in that a storage array or other storage system may rely excessively on issuance of queue-full indicators to host devices.

For example, many applications today run in-memory, and destage the cached changes in batches which produce write bursts. To handle such write bursts under conventional practice, the storage array needs to be sized for bandwidth and CPU resources that may be far beyond those required in steady state operation. Often such write bursts overload the storage array and thus the writes are cached and held in the storage array until the storage array has sufficient bandwidth and CPU resources available to process them.

Write bursts in these and other situations can cause the storage system to frequently signal queue-full conditions back to the host devices, which can adversely impact the performance of the host devices.

A given storage array typically handles IO operations from many hosts, which means that the internal resources of the storage array are divided between the hosts. When one host creates an IO burst, many storage array resources are diverted to handle this host, and thus one or more other hosts may be adversely impacted. For example, a host may fill the storage array front end IO queue with IOs. The storage array may either dedicate too many queue entries for that host, thus starving one or more other hosts, or report a queue-full condition which adversely impacts the overall performance of the host. The queue-full condition is common to both read pressure and write pressure, and provides the host with very limited information. Also, such queue-full conditions are high impact conditions, and performance suffers if queue-full conditions are reported too frequently.

Each of the hosts usually has a queue capacity that is far larger than the queue capacity that the storage array has for that host. Therefore, it would generally be better for the host to avoid sending more commands to the storage array than sending those commands and having the storage array queue the commands.

For example, in some embodiments herein, each of the host devices 102 has a corresponding set of IO queues 110 for storing IO operations to be delivered to the storage array, where a total capacity of the IO queues of the host device is greater than that of an allocated portion of a total IO queue capacity of the storage array that is allocated by the storage array to the host device.

Illustrative embodiments overcome these and other drawbacks of conventional practice by providing a feedback mechanism between the storage array and the host device that informs the host device of such IO capacity issues in the storage array, such that the host can effectively mitigate the load on the storage array.

For example, some embodiments configure host devices to include functionality for automated write throttling using write pressure information periodically read or otherwise obtained from a storage array or other storage system, so as to advantageously avoid the complications of conventional approaches that rely excessively on transmission of queue-full indicators to host devices in the presence of write pressure.

It is assumed without limitation in some embodiments that the storage array maintains a set of internal per-initiator counters that are configured to count IOs arriving from the respective corresponding initiators. As indicated previously herein, each such initiator is illustratively a different HBA of a particular host device. Other types of counters or similar IO monitoring mechanisms can be used in other embodiments.

An example of an algorithm performed by the storage array 105 and the MPIO driver 112-1 of a given one of the host devices 102-1, utilizing write throttling logic 115-1, illustratively includes the following steps:

1. The storage array 105 monitors for write pressure conditions. For example, the storage array 105 may detect a write pressure condition responsive to the storage array as a whole reaching a particular percentage (e.g., 80%) of a designated write pending limit for the storage array, and/or responsive to one or more storage devices each reaching a particular percentage (e.g., 80%) of a designated write pending limit for that storage device.

2. Responsive to the detection of one or more write pressure conditions, the storage array 105 will scan its internal per-initiator counters 121 and find the top X offending initiators, where X is greater than or equal to one. As noted above, each such initiator is illustratively a different HBA of a particular host device, illustratively host device 102-1. In some embodiments, X can have values such as 5, 10, 20, and so on, depending upon implementation-specific factors such as the total number of initiators.

3. The MPIO driver 112-1 will send to the storage array one vendor unique (VU) command per host initiator per second. Other rates and timing arrangements for repeated sending of such VU commands can be used. If the storage array 105 responds to a given such VU command with a response indicating "good status," where such a "good status" response can be provided in a variety of different ways, there is no write pressure condition associated with the corresponding initiator. However, if the storage array 105 responds with a check condition ("chk_cond") response, the MPIO driver 112-1 will throttle down its IOs from that initiator (e.g., by about 10%) for a throttle-down period illustratively comprising a random number of seconds (e.g., between about 0.5 sec and 1.0 second). Other types of amounts of write throttling can be used in other embodiments, as well as different response types and formats.

4. After the initial throttle-down period, the MPIO driver 112-1 will send the VU command again. If the response of the storage array 105 now indicates "good status" for the corresponding initiator, the MPIO driver 112-1 will resume sending IOs from that initiator without further throttling. However, if the storage array 105 again returns the chk_cond response, the MPIO driver 112-1 will continue throttling down the IOs from the initiator for another throttle-down period comprising another random number of seconds (e.g., between about 0.5 seconds and 1.0 second). The throttle-down period comprising a random number of seconds is illustratively configured to distribute the load from the X offending initiators (e.g., each will illustratively restart sending IOs at full capacity after a different randomly-selected throttle-down period).

5. For each of the top X offending initiators, the storage array 105 will return a chk_cond response to the VU command received from the offending initiator of the host device 102-1 if write pressure exists for that initiator. The storage array 105 will continue returning the chk_cond response for the offending initiators in response to corresponding VU commands from the MPIO driver 112-1 as long as the write pressure continues.

As noted above, illustrative embodiments provide significant advantages over conventional practice. For example, these embodiments avoid the negative host performance implications of excessive signaling of queue-full conditions in a storage array. Moreover, illustrative embodiments allow host devices to periodically "test the waters" to determine whether or not storage array write pressure conditions have abated after a random throttle-down period.

The portions of the example techniques described above as being performed by a given MPIO driver 112-1 on a corresponding host device 102-1 can be similarly performed by other MPIO drivers 112 on respective other host devices 102. Such MPIO drivers 112 illustratively form a multi-path layer comprising multi-pathing software of the host devices. Other types of host drivers can be used in other embodiments. For example, in some embodiments, at least a portion of the disclosed automated write throttling functionality is carried out using one or more iSCSI drivers, or other types of non-MPIO host drivers.

Additional examples of automated write throttling arrangements will be described elsewhere herein in conjunction with the embodiments of FIGS. 2 through 4. Other types of automated write throttling arrangements can be used in other embodiments.

These and other functions related to automated write throttling that are referred to herein as being performed by or under the control of the MPIO driver 112-1 can in some embodiments be performed at least in part outside of the MPIO driver 112-1, such as in the host device 102-1 generally.

The above-described functions associated with automated write throttling in the MPIO driver 112-1 in some embodiments are carried out at least in part under the control of its write throttling logic 115-1, illustratively operating in cooperation with path selection logic 114-1. For example, the write throttling logic 115-1 is illustratively configured to control performance of an algorithm comprising the steps of the process in the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and to perform the disclosed functionality for automated write throttling.

Accordingly, functionality described above in the context of the first MPIO driver 112-1 and the first host device 102-1 is assumed to be similarly performed by each of the other MPIO drivers 112-2 through 112-N and/or more generally by their respective host devices 102-2 through 102-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support automated write throttling.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105. Process tags may be used in assigning different ones of the IO operations to different ones of the IO operation priority queues, as disclosed in U.S. Pat. No. 10,474,367, entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage devices 106 of the storage arrays 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, and MPIO drivers 112, including their corresponding instances of path selection logic 114 and write throttling logic 115, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 212, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

Figure 2:
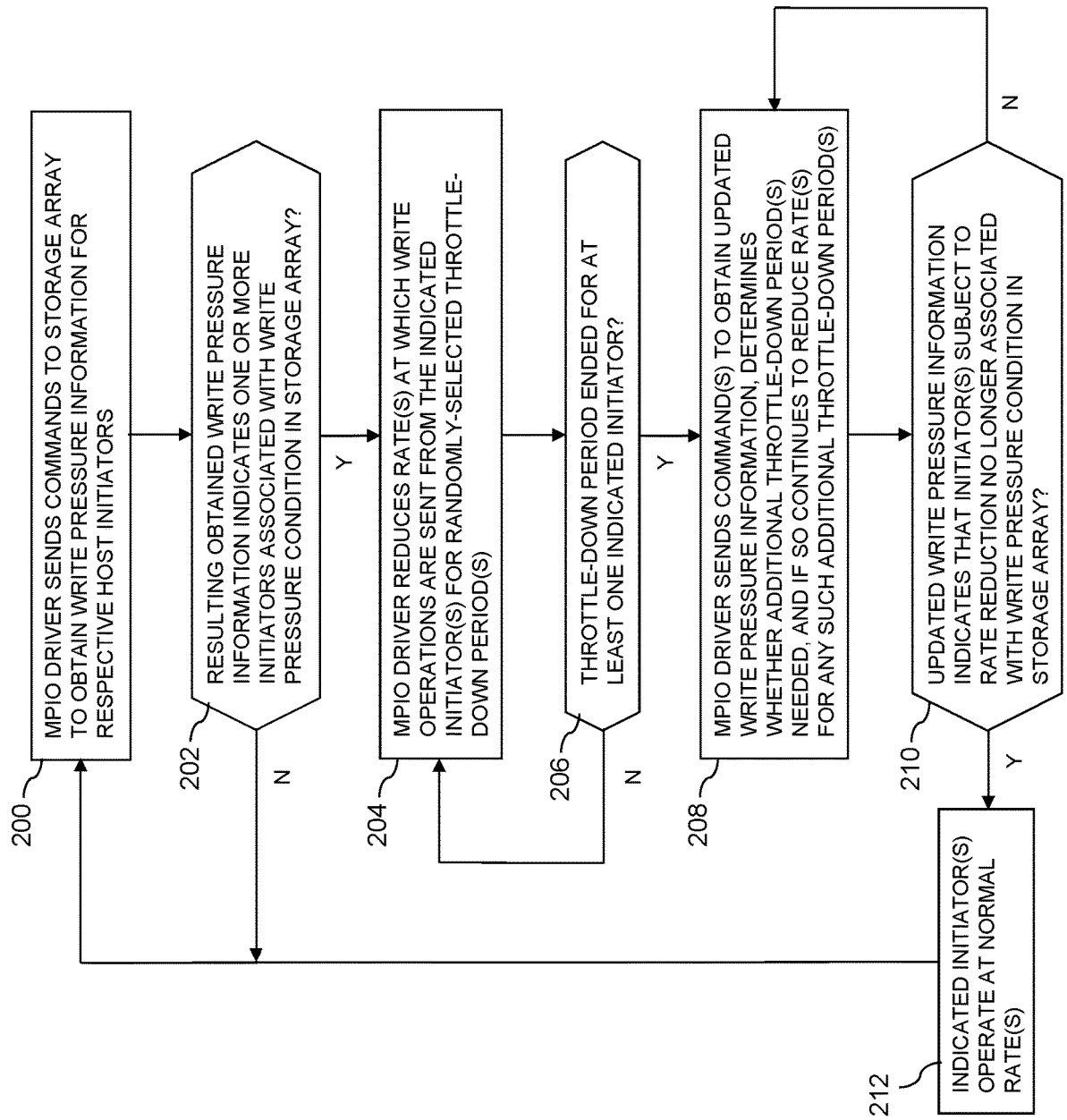
FIG. 2 is a flow diagram of a process for automated write throttling in a multi-path layer of a host device in an illustrative embodiment.

The steps of the FIG. 2 process are illustratively performed at least in part by or under the control of an MPIO driver of a given host device. For example, portions of the process may be carried out under the control of software, firmware and/or hardware of an instance of write throttling logic deployed within the MPIO driver. Accordingly, the FIG. 2 process may be viewed as an example of an algorithm performed by the write throttling logic 115-1 of the MPIO driver 112-1 of host device 102-1. Other arrangements of host device components and/or other system components can be configured to perform at least portions of one or more of the steps in other embodiments.

In step 200, the MPIO driver sends commands to the storage array to obtain write pressure information for respective host initiators. Such commands are illustratively send periodically, such as once per second for each of the initiators. Numerous other timing arrangements for transmission of these commands can be used.

In step 202, a determination is made as to whether or not the obtained write pressure information indicates that one or more initiators are associated with a write pressure condition in the storage array. If no initiators are associated with a write pressure condition in the storage array, the process returns to step 200 to continue with the sending of commands to obtain write pressure information for respective initiators of the host device, and otherwise moves to step 204 as shown.

In step 204, which is reached if at least one of the initiators is associated with a write pressure condition in the storage array, the MPIO driver reduces the rate at which write operations are sent from the one or more indicated initiators for respective randomly-selected throttle-down periods.

In step 206, a determination is made as to whether or not any indicated initiator, for which the rate of sending write operations was reduced in step 204, has reached the end of its throttle-down period. If no such indicated initiator has reached the end of its throttle-down period, the process returns to step 204 to continue to send write operations for the one or more indicated initiators at their respective reduced rates, and otherwise moves to step 208 as shown. It should be noted that in embodiments in which multiple initiators are indicated in step 202 as being associated with a write pressure condition in the storage array, the transition from step 206 to step 208 will likely occur at different times for different ones of the multiple initiators, as such initiators have respective different randomly-selected throttle-down periods.

In step 208, which is illustratively reached at different times in the case of different ones of multiple indicated initiators having respective different throttle-down periods, the MPIO driver sends one or more commands to the storage array to obtain updated write pressure information, determines whether additional throttle-down periods are needed for any of the one or more indicated initiators, and if so continues to reduce the rates at which write operations are sent for any such additional throttle-down periods that may be needed.

In step 210, a determination is made as to whether or not the updated write pressure information indicates that one or more initiators subject to rate reduction are no longer associated with a write pressure condition in the storage array. For any such indicated initiator no longer associated with the write pressure condition in the storage array, the process moves to step 212, and otherwise returns to step 208 as shown. In embodiments in which multiple initiators are indicated in step 202 as being associated with a write pressure condition in the storage array, the transition from step 210 to step 212 can occur at different times for different ones of the multiple initiators.

In step 212, the one or more indicated initiators for which rate reduction was implemented due to their association with a write pressure condition in the storage array return to their respective normal rates. The process then returns to step 200 to continue with the sending of commands to obtain write pressure information for respective initiators of the host device.

Multiple additional instances of the FIG. 2 process may be performed in respective additional host devices that share the storage array. Other embodiments can include multiple storage arrays, with the disclosed functionality for automated write throttling being implemented for each of those storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for automated write throttling. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different automated write throttling arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
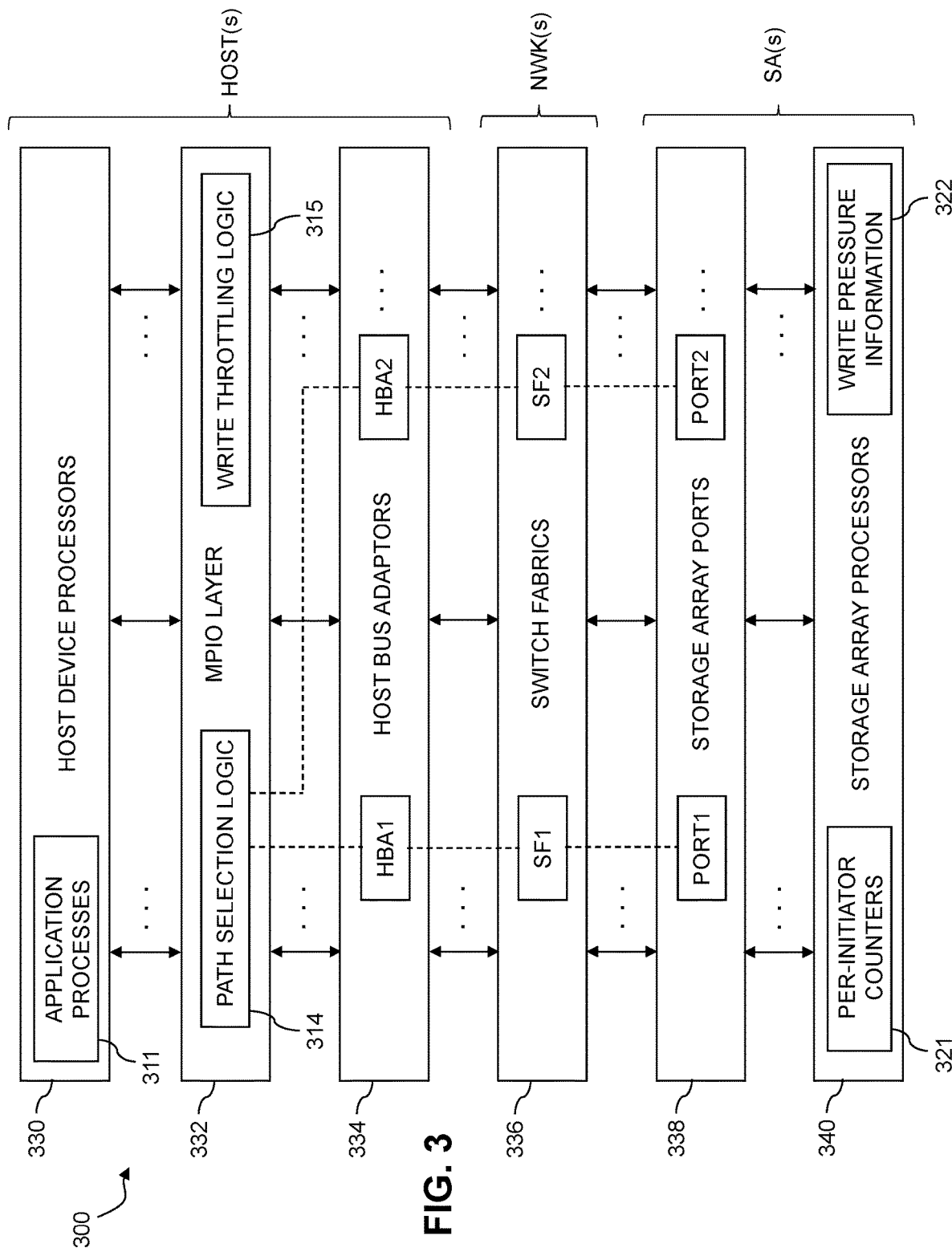
FIG. 3 is a block diagram showing multiple layers of a layered system architecture that includes a multi-path layer with functionality for automated write throttling in an illustrative embodiment.

Referring now to FIG. 3, another illustrative embodiment is shown. In this embodiment, an information processing system 300 comprises host-side elements that include application processes 311, path selection logic 314 and write throttling logic 315, and storage-side elements that include per-initiator counters 321 and write pressure information 322. There may be separate instances of one or more such elements associated with each of a plurality of system components such as host devices and storage arrays of the system 300. In a manner similar to that described elsewhere herein, the write pressure information 322 is determined based at least in part on values of the per-initiator counters 321 in one or more storage arrays, and is obtainable by one or more host devices via their respective MPIO drivers and utilized by the write throttling logic 315 to control rates at which write operations are sent for particular initiators over paths selected by the path selection logic 314.

The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements automated write throttling utilizing one or more MPIO drivers of the MPIO layer 332, and associated instances of write throttling logic 315. The application processes 311 generate IO operations that are processed by the MPIO layer 332 for delivery to the one or more storage arrays. Paths are determined by the path selection logic 314 for sending such IO operations to the one or more storage arrays. These IO operations include write operations that are illustratively subject to write throttling in write throttling logic 315 based at least in part on write pressure information obtained by the MPIO driver for respective host initiators. The write throttling logic 315 operates in cooperation with the path selection logic 314 to in one or more MPIO drivers of the MPIO layer 332 to perform automated write throttling in the manner disclosed herein.

The MPIO layer 332 is an example of what is also referred to herein as a multi-path layer, and comprises one or more MPIO drivers implemented in respective host devices. Each such MPIO driver illustratively comprises respective instances of path selection logic 314 and write throttling logic 315 configured as previously described. Additional or alternative layers and logic arrangements can be used in other embodiments.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment selects paths for delivery of IO operations to the one or more storage arrays having the storage array ports of the storage array port layer 338. More particularly, the path selection logic 314 determines appropriate paths over which to send particular IO operations to particular logical storage devices of the one or more storage arrays.

It is assumed in this embodiment that the host devices through their respective MPIO drivers and respective instances of write throttling logic 315 provide functionality for automated write throttling, illustratively with involvement of other host device components such as the path selection logic 314.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Additional illustrative embodiments will now be described. It is assumed in these embodiments that the MPIO driver of a given host device provides at least portions of the disclosed automated write throttling functionality, possibly with involvement of one or more other host device components.

Referring now to FIG. 4, an example of a set of per-initiator counters 400-i maintained by a storage system such as storage array 105 is shown. The per-initiator counters 400-i are illustratively maintained by the storage array 105 for a particular one of the host devices 102, denoted as host device 102-i in the figure.

It is assumed that a similar set of per-initiator counters is maintained by the storage array 105 for each of the other host devices 102 of the system 100. The per-initiator counters 400-i may therefore be viewed as one possible example of per-initiator counters 121 of the storage array 105. The per-initiator counters are illustratively utilized by the storage array 105 in detecting write pressure conditions and generating corresponding write pressure information 122 that is obtainable by the host device 102-i in some embodiments.

The per-initiator counters 400-i in the FIG. 4 embodiment are associated with respective initiators having respective identifiers denoted as Initiator 1 ID, Initiator 2 ID, . . . Initiator K ID, and provide respective current counts of write operations received in the storage array 105 from respective ones of the initiators.

The per-initiator counters 400-i can be reset in conjunction with an initial start or re-start of at least one of the storage array 105 and the corresponding host device 102-i, and under additional or alternative conditions, such as in conjunction with addition or deletion of initiators, performance of path discovery operations, deployment of new or additional applications on the host device, etc.

The particular per-initiator counter arrangement shown in FIG. 4 is only an example, and numerous other types and arrangements of counters can be maintained by a storage system in other embodiments. Such counters are illustratively used to generate what is referred to herein as "write pressure information" in the storage array. Terms such as "write pressure information" as used herein are intended to be broadly construed, and in some embodiments such write pressure information can include, for example, current values of at least a portion of the per-initiator counters, as well various other types of information derived at least in part from values of one or more of the per-initiator counters.

Write pressure information 122 is illustratively generated by the storage array 105 utilizing an arrangement of per-initiator counters 121 that includes the set of per-initiator counters 410-i of FIG. 4. Commands are sent by an MPIO driver 112-i of the host device 102-i allow that MPIO driver to obtain at least portions of the write pressure information 122. The resulting obtained information illustratively indicates which if any of the HBAs or other initiators of the host device 102-i are currently associated with a write pressure condition detected by the storage array 105, and the write throttling logic 115

As indicated above, the MPIO driver of a given one of the host devices 102 can obtain write pressure information from the storage array 105 by repeatedly sending commands to the storage array. These and other references herein to repeated sending of commands are intended to be broadly construed, so as to encompass, for example, repeatedly sending the same command for each initiator, sending different commands for different initiators, sending multiple instances of a single command to obtain write pressure information for multiple initiators, and numerous other arrangements.

The write pressure information is illustratively stored in a storage array memory accessible to a multi-path layer of the host device. Other types of data structures can be used in other embodiments.

On the host side, at least portions of such write pressure information obtained from the storage array and characterizing one or more initiators of the host device are illustratively stored in a data structure of a kernel-space portion of the MPIO driver 112-1, although other storage arrangements with other types of data structures can be used.

In some embodiments, an MPIO driver obtains write pressure information directly from a storage array, by sending commands to the storage array as described elsewhere herein. For example, MPIO driver 112-1 is illustratively configured to obtain the write pressure information directly from the storage array 105 utilizing an in-band communication mechanism in which one or more commands in a designated storage protocol are sent from the MPIO driver 112-1 or another host device component to the storage array 105.

However, it is possible in some embodiments that one or more MPIO drivers of one or more host devices can obtain the write pressure information other than through direct communication with the storage array. Such arrangements illustratively involve obtaining the connectivity information indirectly from the storage array utilizing an out-of-band communication mechanism via at least one intermediary device, such as the MPIO management station 116, which may comprise one or more servers.

The above-described processes, algorithms and other features and functionality disclosed herein are presented by way of illustrative example only, and other embodiments can utilize additional or alternative arrangements.

Also, as mentioned previously, different instances of the above-described processes, algorithms and other automated write throttling techniques can be performed by different MPIO drivers in different host devices, or using other types of host drivers, such as, for example, iSCSI drivers.

The particular automated write throttling arrangements described above are therefore presented by way of illustrative example only. Numerous alternative arrangements of these and other features can be used in implementing the automated write throttling in other illustrative embodiments.

The illustrative embodiments disclosed herein can provide a number of significant advantages relative to conventional arrangements.

For example, some embodiments configure host devices to include functionality for automated write throttling using write pressure information periodically read or otherwise obtained from a storage array or other storage system, so as to advantageously avoid the complications of conventional approaches that rely excessively on transmission of queue-full indicators to host devices in the presence of write pressure.

Illustrative embodiments can therefore prevent significant degradations in IO processing performance that might otherwise occur if excessive numbers of queue-full indicators were generated by a storage array or other storage system.

Moreover, illustrative embodiments allow host devices to periodically "test the waters" in order to determine in a particularly efficient manner whether or not storage array write pressure conditions have abated.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system.

Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™, or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 and write throttling logic 115 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, write throttling logic and additional or alternative components. Also, the particular configurations of system and device elements and associated processing operations illustratively shown in the drawings can be varied in other embodiments. For example, a wide variety of different host device configurations and associated automated write throttling arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
   a host device comprising a processor coupled to a memory;
   where the host device is configured:
   for each of a plurality of initiators of the host device from which write operations are sent to a storage system for processing, to repeatedly send to the storage system a command associated with that initiator to obtain from the storage system write pressure information maintained by the storage system for that initiator as one of a plurality of separate instances of write pressure information individually maintained by the storage system for respective ones of the plurality of initiators; and
   responsive to the write pressure information obtained from the storage system for a corresponding one of the initiators indicating that the corresponding initiator is associated with a write pressure condition, to at least temporarily reduce a rate at which the write operations are sent from the corresponding initiator to the storage system.

2. The apparatus of claim 1 wherein the initiators comprise respective host bus adaptors of the host device.

3. The apparatus of claim 1 wherein the command comprises at least one predetermined vendor unique command of a storage access protocol which the host device utilizes to communicate with the storage system.

4. The apparatus of claim 1 wherein the host device further comprises a multi-path layer comprising at least one multi-path input-output driver configured to control delivery of input-output operations, including the write operations of the host device, to particular ports of the storage system over selected ones of a plurality of paths through a network, and wherein repeatedly sending the command, and at least temporarily reducing the rate, are performed by the multi-path input-output driver of the host device.

5. The apparatus of claim 4 further comprising one or more additional host devices each configured to communicate over the network with the storage system and wherein each additional host device comprises at least one multi-path input-output driver configured to control delivery of input-output operations, including write operations of that host device, from that host device to particular ports of the storage system over selected ones of a plurality of paths through the network, and wherein repeatedly sending the command, and at least temporarily reducing the rate, are separately performed by each of the multi-path input-output drivers of respective ones of the one or more additional host devices.

6. The apparatus of claim 4 wherein the paths are associated with respective initiator-target pairs with each of the initiators of the initiator-target pairs comprising a corresponding host bus adaptor of the host device and each of a plurality of targets of the initiator-target pairs comprising a corresponding one of the ports of the storage system.

7. The apparatus of claim 1 wherein the write pressure information obtained by the host device for respective ones of the initiators is determined in the storage system utilizing a plurality of per-initiator write operation counters of the storage system.

8. The apparatus of claim 7 wherein a given one of the per-initiator write operation counters maintains a count of write operations received in the storage system from a corresponding one of the initiators.

9. The apparatus of claim 1 wherein the write pressure information obtained by the host device from the storage system for a corresponding one of the initiators is determined in the storage system based at least in part on identification by the storage system of one or more of the initiators that are each making a relatively high contribution to a write pressure condition detected in the storage system as compared to other ones of the initiators that are each making a relatively low contribution to the write pressure condition detected in the storage system.

10. The apparatus of claim 1 wherein the write pressure information obtained by the host device from the storage system for a corresponding one of the initiators comprises one of (i) an indication that the corresponding initiator is not currently making a relatively high contribution to a write pressure condition detected in the storage system as compared to other ones of the initiators, and (ii) an indication that the corresponding initiator is currently making a relatively high contribution to a write pressure condition detected in the storage system as compared to other ones of the initiators.

11. The apparatus of claim 10 wherein the write pressure condition detected in the storage system comprises at least one of:
   the storage system reaching a specified percentage of a designated write pending limit for the storage system; and
   each of one or more storage devices of the storage system reaching a specified percentage of a designated write pending limit for that storage device.

12. The apparatus of claim 10 wherein the indication that the corresponding initiator is currently making a relatively high contribution to a write pressure condition detected in the storage system as compared to other ones of the initiators comprises a check condition indicator received by the host device from the storage system responsive to sending the command.

13. The apparatus of claim 1 wherein at least temporarily reducing a rate at which the write operations are sent from the corresponding initiator to the storage system comprises:
- reducing the rate by a specified amount for a throttle-down period;
- repeating the sending of the command in conjunction with an end of the throttle-down period; and
- determining based at least in part on write pressure information obtained utilizing the repeated sending of the command whether or not to continue to reduce the rate for another throttle-down period.

14. The apparatus of claim 13 wherein a duration of a given one of the throttle-down periods is determined by randomly selecting the duration of the throttle-down period from a specified range of possible durations.

15. A method comprising:
- for each of a plurality of initiators of a host device from which write operations are sent to a storage system for processing, to repeatedly send to the storage system a command associated with that initiator to obtain from the storage system write pressure information maintained by the storage system for that initiator as one of a plurality of separate instances of write pressure information individually maintained by the storage system for respective ones of the plurality of initiators; and
- responsive to the write pressure information obtained from the storage system for a corresponding one of the initiators indicating that the corresponding initiator is associated with a write pressure condition, at least temporarily reducing a rate at which the write operations are sent from the corresponding initiator to the storage system;
- wherein the method is performed by the host device, the host device comprising a processor coupled to a memory.

16. The method of claim 15 wherein the write pressure information obtained by the host device for respective ones of the initiators is determined in the storage system utilizing a plurality of per-initiator write operation counters of the storage system.

17. The method of claim 15 wherein at least temporarily reducing a rate at which the write operations are sent from the corresponding initiator to the storage system comprises:
- reducing the rate by a specified amount for a throttle-down period;
- repeating the sending of the command in conjunction with an end of the throttle-down period; and
- determining based at least in part on write pressure information obtained utilizing the repeated sending of the command whether or not to continue to reduce the rate for another throttle-down period.

18. A computer program product comprising a non-transitory processor-readable storage medium having stored therein program code of one or more software programs, wherein the program code, when executed by a host device comprising a processor coupled to a memory, causes the host device:
- for each of a plurality of initiators of the host device from which write operations are sent to a storage system for processing, to repeatedly send to the storage system a command associated with that initiator to obtain from the storage system write pressure information maintained by the storage system for that initiator as one of a plurality of separate instances of write pressure information individually maintained by the storage system for respective ones of the plurality of initiators; and
- responsive to the write pressure information obtained from the storage system for a corresponding one of the initiators indicating that the corresponding initiator is associated with a write pressure condition, to at least temporarily reduce a rate at which the write operations are sent from the corresponding initiator to the storage system.

19. The computer program product of claim 18 wherein the write pressure information obtained by the host device for respective ones of the initiators is determined in the storage system utilizing a plurality of per-initiator write operation counters of the storage system.

20. The computer program product of claim 18 wherein at least temporarily reducing a rate at which the write operations are sent from the corresponding initiator to the storage system comprises:
- reducing the rate by a specified amount for a throttle-down period;
- repeating the sending of the command in conjunction with an end of the throttle-down period; and
- determining based at least in part on write pressure information obtained utilizing the repeated sending of the command whether or not to continue to reduce the rate for another throttle-down period.

* * * * *